United States Patent
Wang et al.

(10) Patent No.: US 12,141,139 B2
(45) Date of Patent: Nov. 12, 2024

(54) AUTOMATIC INDEX CREATION FOR RELATIONAL DATABASE SYSTEMS

(71) Applicant: SAP SE, Walldorf (DE)

(72) Inventors: Xiaotao Wang, Xi'an (CN); Jing He, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/748,140

(22) Filed: May 19, 2022

(65) Prior Publication Data

US 2023/0376482 A1 Nov. 23, 2023

(51) Int. Cl.
*G06F 16/2452* (2019.01)
*G06F 16/22* (2019.01)
*G06F 16/242* (2019.01)
*G06F 16/28* (2019.01)

(52) U.S. Cl.
CPC .... *G06F 16/24528* (2019.01); *G06F 16/2237* (2019.01); *G06F 16/243* (2019.01); *G06F 16/288* (2019.01)

(58) Field of Classification Search
CPC ............. G06F 16/24528; G06F 16/243; G06F 16/2237; G06F 16/288
USPC ........................................................ 707/769
See application file for complete search history.

(56) References Cited

U.S. PATENT DOCUMENTS

| | | | |
|---|---|---|---|
| 6,182,066 B1 * | 1/2001 | Marques | G06F 16/9538 707/999.005 |
| 6,496,834 B1 * | 12/2002 | Cereghini | G06F 16/285 707/999.102 |
| 8,645,409 B1 * | 2/2014 | Garg | G06F 16/3349 707/769 |
| 8,838,593 B2 * | 9/2014 | Apanowicz | H03M 7/30 707/791 |
| 11,048,702 B1 * | 6/2021 | Kumar | G06F 16/3329 |
| 2009/0327320 A1 * | 12/2009 | Yan | G06F 16/35 |
| 2010/0076994 A1 * | 3/2010 | Soroca | G06F 16/68 707/769 |
| 2012/0296891 A1 * | 11/2012 | Rangan | G06F 16/3347 707/E17.014 |
| 2019/0130013 A1 * | 5/2019 | Kempf | G06N 20/20 |
| 2020/0401598 A1 * | 12/2020 | Mehrotra | G06F 16/2282 |
| 2021/0149963 A1 * | 5/2021 | Agarwal | G06F 16/90332 |
| 2022/0222233 A1 * | 7/2022 | Enuka | G06F 16/285 |

FOREIGN PATENT DOCUMENTS

WO WO-2017099805 A1 * 6/2017 ....... G06F 17/30554

* cited by examiner

*Primary Examiner* — Giovanna B Colan
(74) *Attorney, Agent, or Firm* — Fish & Richardson P.C.

(57) ABSTRACT

Methods, systems, and computer-readable storage media for automatic index creation for relational database systems. Query statements from a relational database are processed to generate query patterns from the query statements. Vectorization of the query patterns is performed to transform each query pattern into a numerical vector. A clustering algorithm is executed to cluster the numerical vectors into multiple clusters. Each cluster has a respective cluster center. A frequent query pattern is determined, for at least some of the multiple clusters, that corresponds to a respective cluster center. Active columns in the frequent query patterns are determined and a database index is automatically created for each active column that does not currently have a database index.

20 Claims, 8 Drawing Sheets

AUTOMATIC INDEX CREATION FOR RELATIONAL DATABASE SYSTEMS

BACKGROUND

Relational database management systems can use indices for improving query performance. For example, index use can improve performance for large-scale and data-intensive applications, including cloud applications. Specific indices can be selected and configured for specific types of queries and workloads. However, size and characteristics of workloads can change over time so a set of indices configured at one point in time for a current workload may not be a best set of indices for a workload that occurs at a later point in time.

SUMMARY

Implementations of the present disclosure are directed to automatic index creation for relational database systems. In some implementations, actions include processing query statements from a relational database to generate query patterns from the query statements. Vectorization of the query patterns is performed to transform each query pattern into a numerical vector. A clustering algorithm is executed to cluster the numerical vectors into multiple clusters. Each of the multiple clusters has a respective cluster center. A frequent query pattern that corresponds to a respective cluster center is determined for at least some of the multiple clusters. Active columns in the frequent query patterns are determined. A database index is automatically created for each active column that does not currently have a database index.

Other implementations of this aspect include corresponding systems, apparatus, and computer programs, configured to perform the actions of the methods, encoded on computer storage devices.

These and other implementations can each optionally include one or more of the following features. Generating the query patterns can include removing literal values from the query statements to generate simplified query statements and generating the query patterns by converting the simplified query statements into lists of single words. Performing the vectorization can include creating a vocabulary based on the lists of single words in the generated query patterns and performing a term frequency-inverse document frequency algorithm using the vocabulary and the generated query patterns to transform each query pattern into a numerical vector. The database can be automatically monitoring for database workload changes. In response to determining that a database workload has changed, recent query statements can be retrieved from the relational database. The recent query statements can be processed to generate updated query patterns. Vectorization of the updated query patterns can be performed to generate updated numerical vectors. The clustering algorithm can be executed to generate updated clusters from the updated numerical vectors. Updated active columns can be determined from cluster centers in the updated clusters and a new database index can be automatically created for each updated active column that does not currently have a database index. Determining that the database workload has changed can include determining that a new applications is online, such as by processing recent query statements to generate new query words and determining that the new application is online based on a ratio of the new query words to words in the vocabulary being more than a predetermined threshold ratio. Determining that the database workload has changed can include determining that query structures have changed, which can include training a neural network model to predict query counts based on historical query counts and historical physical database metrics, using a trained neural network model to generate a predicted query count for a current time period, determining an actual query count for the current time period, and determining that the query structures have changed based on a difference between and the actual query count being more than a predetermined threshold difference. The clustering algorithm can be a Gaussian mixture model algorithm. Frequent query patterns can be determined for cluster centers of clusters that represent at least a threshold percentage of query patterns.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
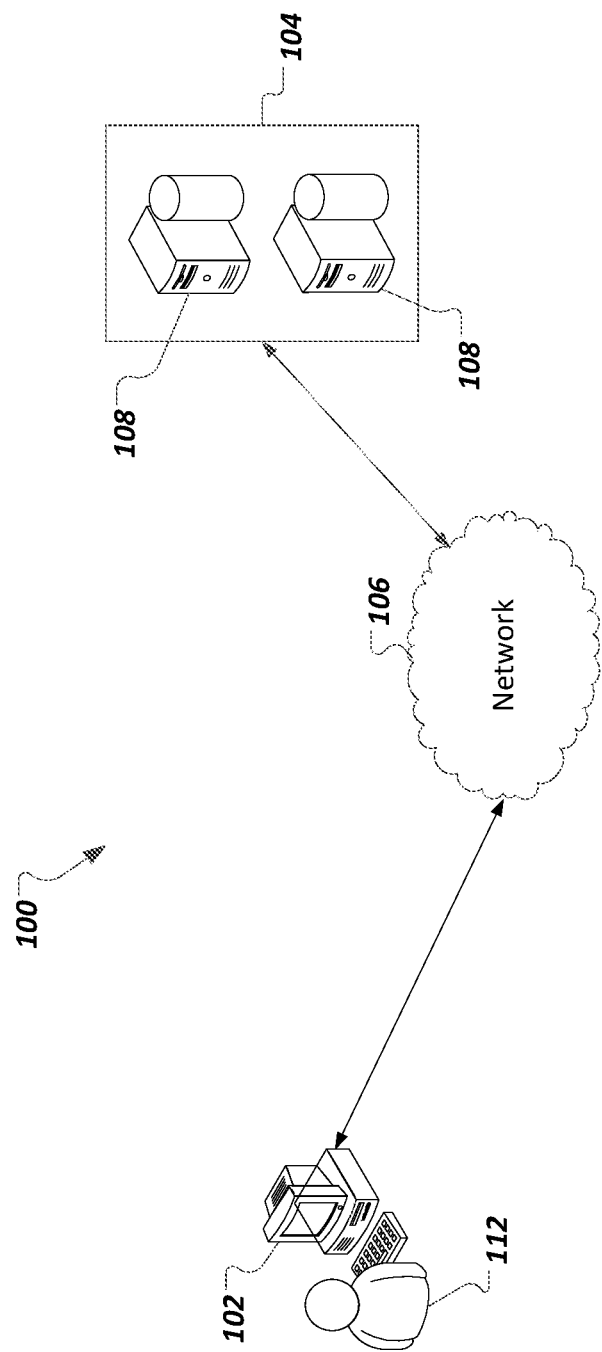
FIG. 1 depicts an example architecture that can be used to execute implementations of the present disclosure.

Implementations of the present disclosure are directed to automatic index creation for relational database systems.

In relational database systems, database workloads can change over time, so database indices that were configured for a historical workload may not be a best configuration of indices for a current workload or future workloads. Databases that do not have a best configuration of indices, due to outdated indices or indices that were otherwise not initially a best selection, generally perform more poorly as compared to databases that have a better index configuration. Databases that do not have a best configuration of indices generally take more time to perform a same query. Accordingly, resources such as processors are less-efficiently utilized, and are allocated for longer periods of time to queries than would occur if indices were more appropriately assigned.

To solve these technical problems, an automatic index configuration system can dynamically create or adjust indices as part of automated maintenance of a database system. As described in more detail below, the automatic index configuration system can automatically determine which columns or combinations of columns are to be used for index creation. The automatic index configuration system can determine which columns are to be used for indices and how many indices should be created. Although creation of indices can result in faster database performance, index creation itself consumes database resources, so the automatic index configuration system can determine a number of indices to create that best balances index creation resource usage with resource savings from configured indices. After the automatic index configuration system creates or reconfigures indices, the automatic index configuration system can automatically monitor for and detect workload changes and analyze the workload changes to determine whether to update currently-used indices.

In further detail, the automatic index configuration system can implement an automatic index creation scheme that is based on natural language processing (NLP), clustering, and regression algorithms. The automatic index configuration system can use clustering, for example, to automatically determine active columns. The automatic index configuration system can create indices on the automatically-determined active columns. Configuring indices on active (or most active) columns can improve database performance.

The automatic index configuration system can use rules and regression analysis to continually monitor database workloads and determine whether a workload change has occurred. If a workload change has occurred, the automatic index configuration system can determine whether new or modified indices would improve performance for processing the changed workload. For example, the automatic index configuration system can recalculate new cluster centers to determine whether current active columns are different from previously-determined active columns. If active columns have changed, the automatic index configuration system can reconfigure indices to match the changed active columns. The automatic index configuration system can automatically continue to monitor workloads and adjust indices as needed. Additionally, index configuration based on automatically-determined active columns can result in indices that better improve database performance than indices that are selected by a database administrator based solely on administrator knowledge or estimation of which columns to use for index creation.

The automatic index configuration system can provide various technical advantages. As described, a balance between resource cost from creating indices and performance gain from index configuration can be achieved. Automatic index creation can result in faster and more accurate implementation of database indices for improving query performance. More accurate index configuration can result in overall improved query performance, thus saving resources of the database management system.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can be a relational database system or can otherwise include a relational database. The server system 104 can include functionality to automatically create database indices for active columns of queries submitted to the relational database, as described in more detail below.

Figure 2:
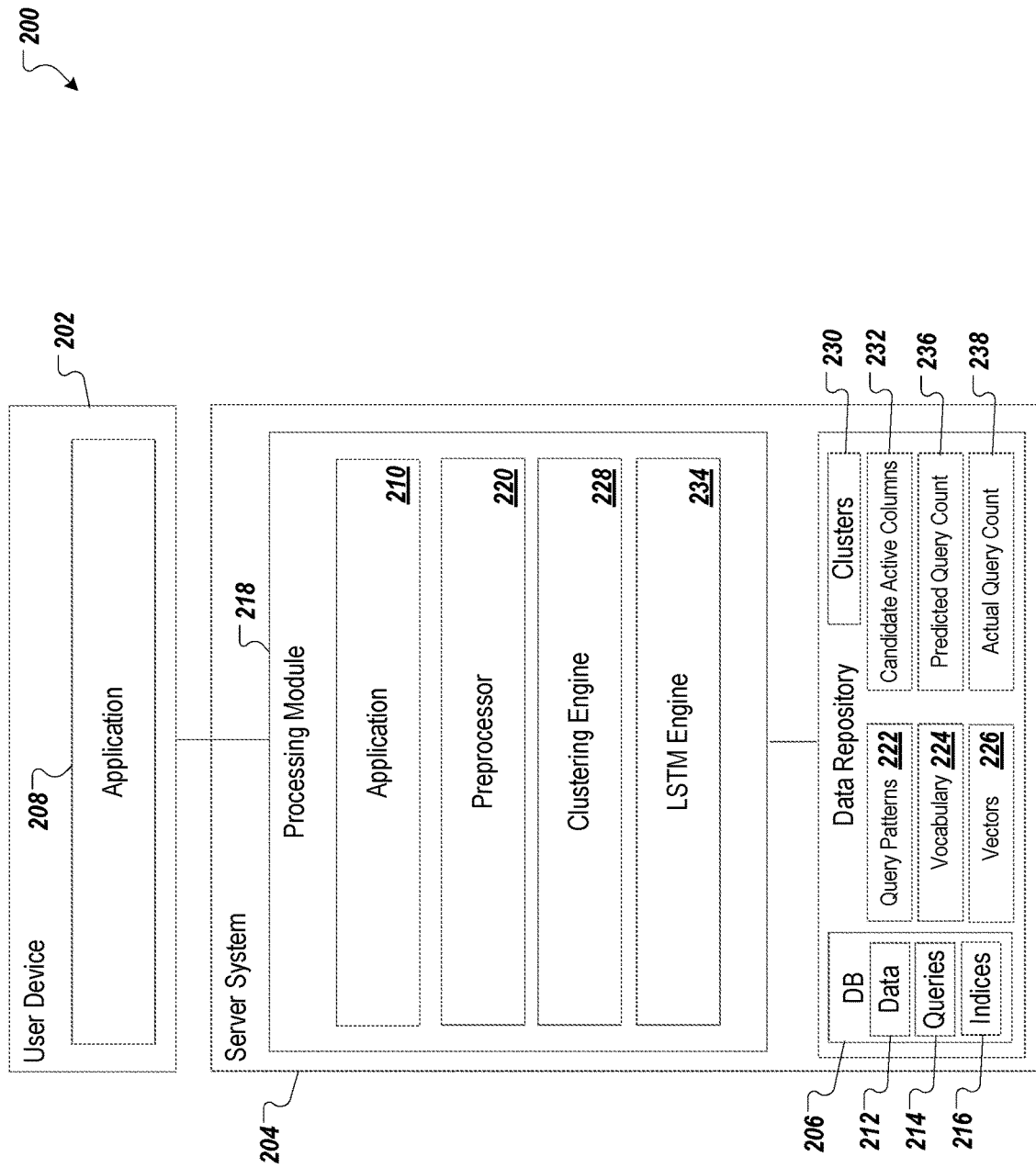
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a user device 202 and a server system 204. As described in further detail herein, the server system 204 can be configured for automatic index creation for improving the performance of a database 206. The database 206 can be a relational database. The server system 206 can be a relational database system or can be a system that is otherwise associated with or connected to a relational database system.

The user device 202 includes a client-side application 208. The client-side application 208 can be configured to submit requests to the server system 204. Client requests from the client-side application 208 can be received and processed by a server-side application 210, for example. The server-side application 210 can, as part of handling client requests, submit one or more queries to the database 206. The database 206 can execute a received query to generate a query result (which can include data 212 from the database 206), and provide the query result to the server-side application 210. The server-side application 210, in turn, can respond to the client-side application 208, for example, with a response that is based on a query result.

The database 206 can store queries (and in some cases query results) in a queries log 214. The database 206 can include database indices 216 (e.g., on certain columns of the data 212) for improvement of database performance. As described in more detail below, a processing module 218 of the server system 204 can automatically configure database indices.

For example, a preprocessor 220 can process the queries log 214 to generate query patterns 222 from queries in the queries log 214. For instance, the preprocessor 220 can remove literal values from the queries to generate simplified query statements and generate the query patterns 222 by converting the simplified query statements into lists of single words. The preprocessor can include the single words in a vocabulary 224. The preprocessor 220 can also perform vectorization of the query patterns 222 to transform the query patterns 222 into respective numerical vectors 226. Preprocessing and vectorization is described in more detail below with respect to FIG. 4.

A clustering engine 228 can execute a clustering algorithm to cluster the numerical vectors 226 into multiple clusters 230. The clustering algorithm can be a Gaussian Mixture Model (GMM) algorithm, for example. Each of the multiple clusters 230 can have a respective cluster center. The processing module 218 can determine, for at least some of the multiple clusters, a frequent query pattern of the query patterns 222 that corresponds to a respective cluster center. The processing module 218 can use a tradeoff approach that balances a cost of creating indices and an improvement of query performance that may result from index creation. For example, rather than determine a frequent query pattern for every cluster center, the processing module 208 can determine frequent query patterns for top clusters which have more than a predefined percentage (e.g., 5%) of the numerical vectors 226. Clustering is described in more detail below with respect to FIG. 5.

The processing module 218 can determine candidate active columns 232 from the frequent query patterns. The processing module 218 can determine, for each active candidate column 232, if an index exists in the indices 216 for the candidate active column 232. If an index does not exist for the candidate active column 232, the processing module 218 can automatically create an index in the indices 216 for the candidate active column 232.

The processing module 218 can perform processing to continually monitor a workload of the database 206, determine whether the workload has changed, and initiate another cycle of processing to determine whether any new indices are to be created based on the workload change. For example, the processing module 218 can implement a rule-based scheme to determine whether a new application is online. As another example, the processing module 218 can use a LSTM (Long Short-Term Memory) engine 234 to determine whether query structures have changed. For example, the LSTM engine 234 can use a model that generates a predicted query count 236. The predicted query count 236 can be compared to an actual query count 238 to determine whether query structures have changed. Workload monitoring is described in more detail below with respect to FIG. 7.

Figure 3:
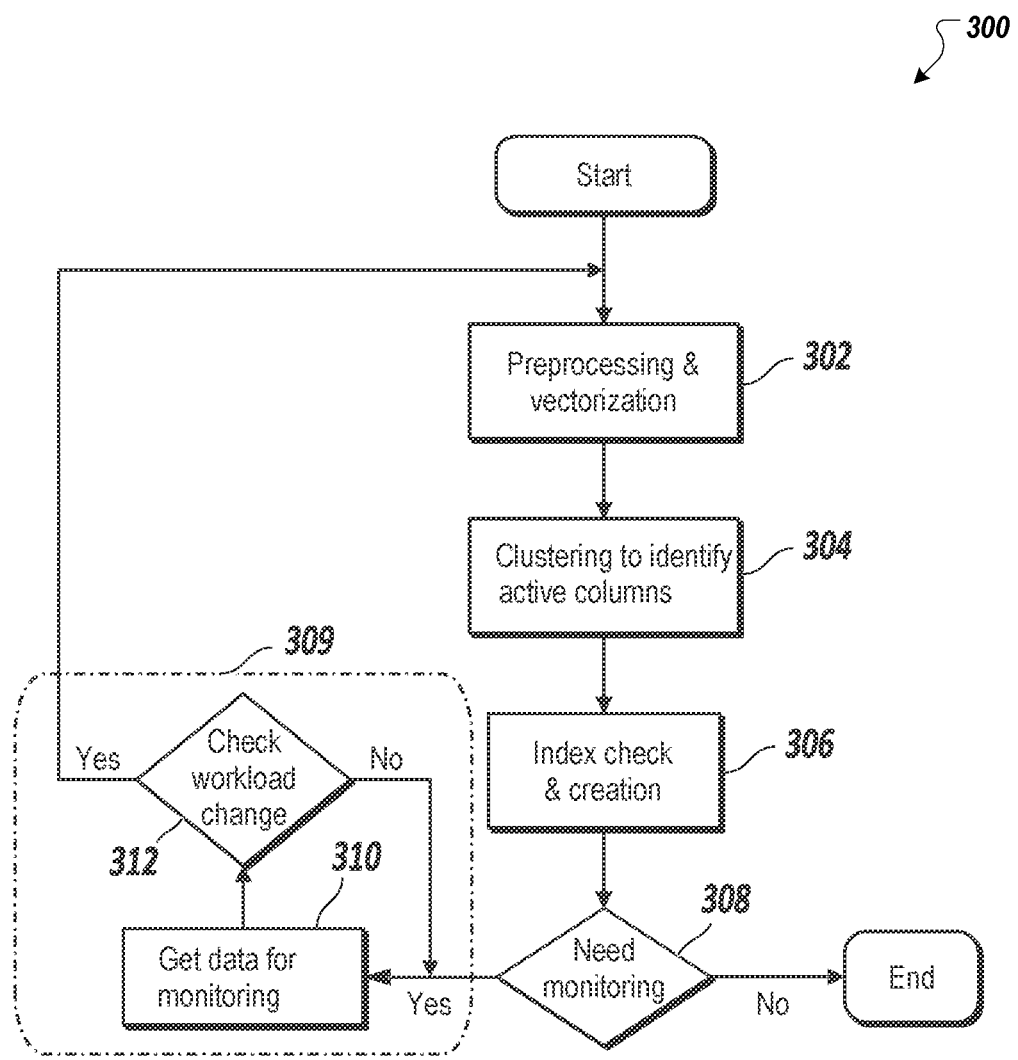
FIG. 3 is a flowchart of an example method for automatic index creation.

FIG. 3 is a flowchart of an example method 300 for automatic index creation. At 302, a first phase of preprocessing and vectorization is performed. Preprocessing can be performed to reduce a number of query patterns that are processed in later steps. Vectorization can be performed to transform query text into numerical values. As mentioned, preprocessing and vectorization is described in more detail below with respect to FIG. 4.

At 304, a second phase is initiated by performing clustering to identify active columns. For example, clustering can be performed to cluster query pattern vectors that were generated in the first phase.

At 306, the second phase is continued by performing an index check and creation process. For example, a check can be performed to determine whether an identified active column already has an index. If the identified active column does not have an index, an index can be created for the identified active column. As mentioned, the second phase is described in more detail below with respect to FIG. 5.

At 308, a third phase is initiated by determining whether monitoring is configured. If monitoring is not configured, the method 300 can end. If monitoring is configured, a workload monitoring process 309 can be performed. The workload monitoring process 309 can be performed to continually monitor the database workload constantly and determine whether a workload change has happened. If a workload change has occurred, re-clustering can be performed to determine whether new active columns exist that are candidates for index creation. As mentioned, the workload monitoring process 309 is described in more detail below with respect to FIG. 6.

In further detail, at 310, data for monitoring is retrieved and/or determined. As described below, data used for workload monitoring can include recent query information, a predicted count, and an actual query count.

At 312, a determination is made as to whether a workload has changed. For example, the workload monitoring process 309 can include determining if a new application is online or if query structures have changed. If the workload has not changed, the method 300 continues again at 310. If the workload has changed, the method 300 continues by initiating the first phase again at 302.

Figure 4:
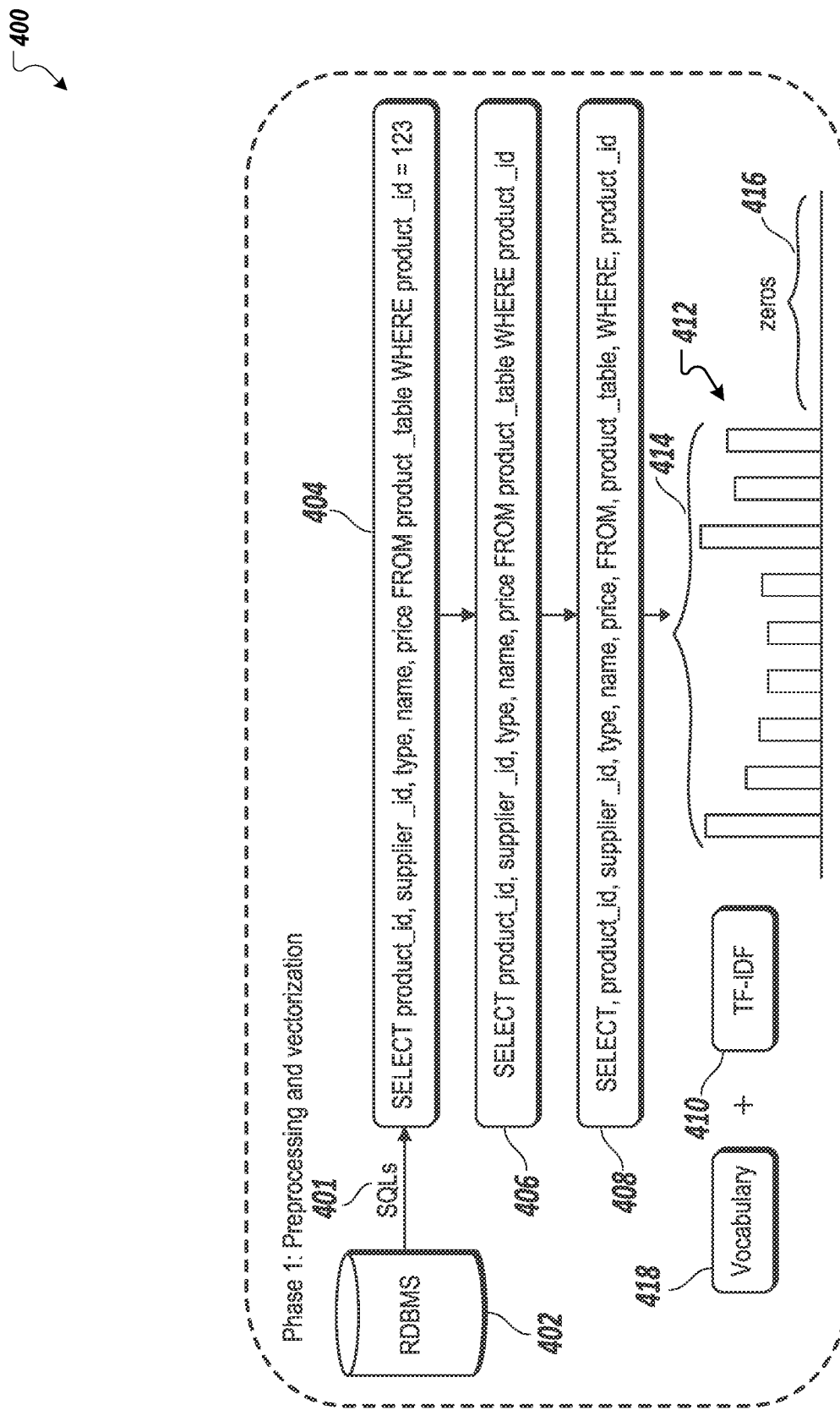
FIG. 4 illustrates an example system for a first phase of preprocessing and vectorization.

FIG. 4 illustrates an example system 400 for a first phase of preprocessing and vectorization. The first phase can include preprocessing of queries and quantifying the preprocessed queries in a vector form. Applications can use or generate, for example, many thousands of query statements. Processing each such statement as a separate query pattern would involve significant computation complexity. To reduce computational complexity, preprocessing can be performed to reduce a number of query patterns that are processed in later phases.

For example, queries (e.g., SQL (Structured Query Language) statements) 401 can be retrieved from a database 402. For instance, an example query 404 (e.g., SELECT product_id, supplier_id, type, name, price FROM product_table WHERE product_id=123) can be retrieved from the database 402. Preprocessing queries such as the example query 404 can include removing, from a given query, literal values such as literal numerical constants and literal string or character values. Literal values can be included in queries, such as in equality expressions (e.g., "product_id=123"), relational expressions (e.g., "price>100), or other expressions. Equality expressions, relational expressions, and other types of expressions can be included in WHERE clauses of queries, for example. The preprocessing of phase one can include locating and removing literal digits, strings, or other constant values from query WHERE clauses. By removing constant values in a WHERE sub-clause but maintaining key words of a query predicate, the preprocessing operations can identify and maintain what can be referred to as sentence trunks of retrieved query statements. The removed constant values can be deemed as irrelevant for later steps (e.g., clustering), for example. By removing irrelevant query portions, many similar queries can each be simplified into a same single query pattern.

As an example, a preprocessed query 406 (e.g., SELECT product_id, supplier_id, type, name, price FROM product_table WHERE product_id) is shown that corresponds to the example query 404 but with a literal portion (e.g., "=123") of the example query 404 not included in the preprocessed query 406. The preprocessed query 406 can represent a common query pattern that corresponds to multiple queries retrieved from the database 402.

The query pattern of the preprocessed query 406 can be further processed by splitting the query pattern into multiple single words. For example, a query pattern 408 (e.g., SELECT, product_id, supplier_id, type, name, price, FROM, product_table, WHERE, product_id) corresponds to the preprocessed query 406, but with each separate word (e.g., token) separated by commas.

A TF-IDF (Term Frequency-Inverse Document Frequency) engine 410 can use NLP (Natural Language Processing) techniques to transform query patterns such as the query pattern 408 into numerical values (e.g., vectors). For example, the TF-IDF engine 410 can transform the query pattern 408 into a vector 412. The vector 412 includes non-zero values 414 and zero values 416. The TF-IDF engine 410 can generate a vocabulary 418 that includes words of all query patterns processed by the TF-IDF engine 410. The vectors (e.g., the vector 412) generated by the TF-IDF engine 410 can be provided as input to a next phase (e.g., phase two, a clustering phase).

Figure 5:
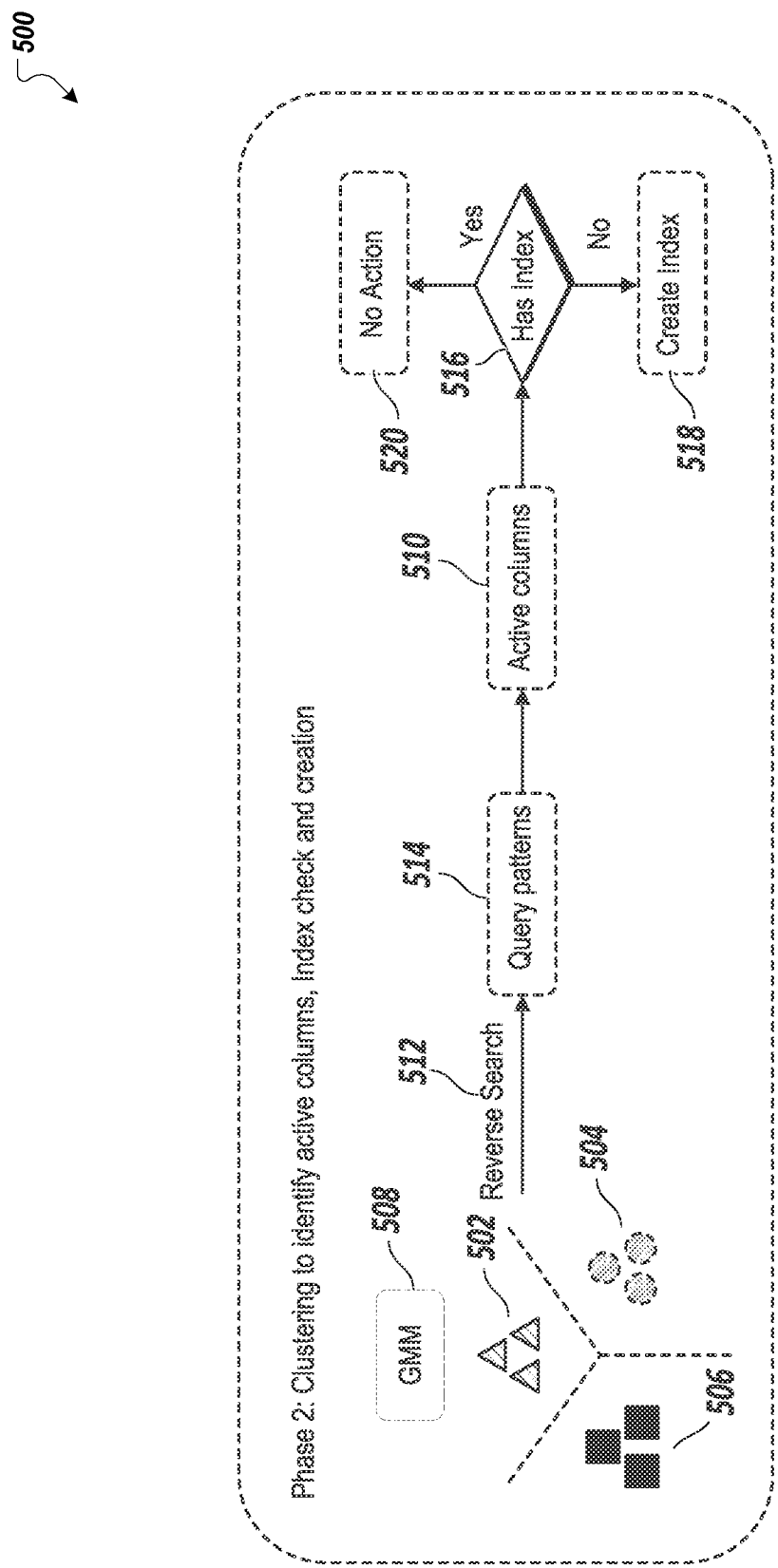
FIG. 5 illustrates an example system for a second phase of clustering for determining active columns, checking for indices, and creating indices.

FIG. 5 illustrates an example system 500 for a second phase of clustering for determining active columns, checking for indices, and creating indices. The second phase can include determining active columns based on performing clustering on the vectors generated in phase one. Active columns can be columns that most frequently appear in queries, for example.

Creating indices on active columns can increase query performance. Although the number of query patterns can be significantly reduced by the preprocessing performed in phase one, the query patterns in phase one may generally still include more candidate columns for index creation that would be practical or desired as far as creating an index for each candidate column. As mentioned above, creating indices incurs a cost and the system can strive to determine a balance an index creation cost and a performance improvement resulting from index creation. Accordingly, clustering can be performed to reduce a set of candidate columns for index creation. Clustering can include grouping similar query pattern vectors generated from phase one into clusters. For example, example vector clusters 502, 504, and 506 are illustrated.

Various types of clustering approaches can be used. In some implementations, a GMM 508 is used for clustering. When clusters are identified using the GMM model 508, if a given cluster includes more than a first threshold percentage (e.g., 30%) of query pattern vectors, the cluster can be split into multiple smaller clusters. Clustering using the GMM model 508 can be performed until a GMM process converges to a stable state. Resulting cluster centers that are generated by a stable state GMM model 508 can be identified as corresponding to active columns. In some cases, only cluster centers of clusters that have at least a second threshold percentage (e.g., 5%) of query pattern vectors are used for determining active columns.

Active columns 510 can be determined from the GMM clustering by performing a reverse search process 512 to determine query patterns 514 that correspond to the cluster centers determined using the GMM model 508. The active columns 510 can be columns that are included in the query patterns 514 that correspond to cluster centers, for example. For each column in the active columns 510, a test 516 can be performed to determine whether an index already exists for the column. If the column does not currently have an index, an index creation step 518 can be performed for the column. If the column already has an index, then no action is taken to create an index for the column (e.g., as shown at 520). The GMM model 508 can be selected over other clustering approaches because the GMM model 508 may perform better than other approaches that assume a single distribution.

The GMM model 508 can also have advantages for subsequent clustering processing performed in response to dynamic workloads. As described in more detail below, other clustering iterations can be performed in response to detection of workload changes. The GMM model 508 can be configured to restart clustering for a subsequent cluster run using previously-determined cluster centers as initial states, rather than performing clustering from scratch. Clustering using the GMM model 508 can include computation of similarity values between new query pattern vectors and existing cluster centers. Each new query pattern vector can be added to a cluster that has a cluster center most similar to the query pattern vector. After new query pattern vectors are added to respective clusters, model-related variables for the GMM model 508 can be recomputed (and new cluster clusters and new cluster centers can be identified).

The accuracy of selecting actual active columns for index creation can depend on a time interval of observed data. For example, the longer a time interval represented in data used for clustering, the higher the likelihood of selecting actual columns that are most active. In some cases, a month's worth of data can be used for active column determination. Other time intervals can be used.

As described in more detail below, query pattern vectors can be re-clustered in response to a workload change. Clustering can be an online process that repeats as needed due to varying workloads. Accordingly, clustering can be an ongoing, dynamic, and incremental process.

Figure 6:
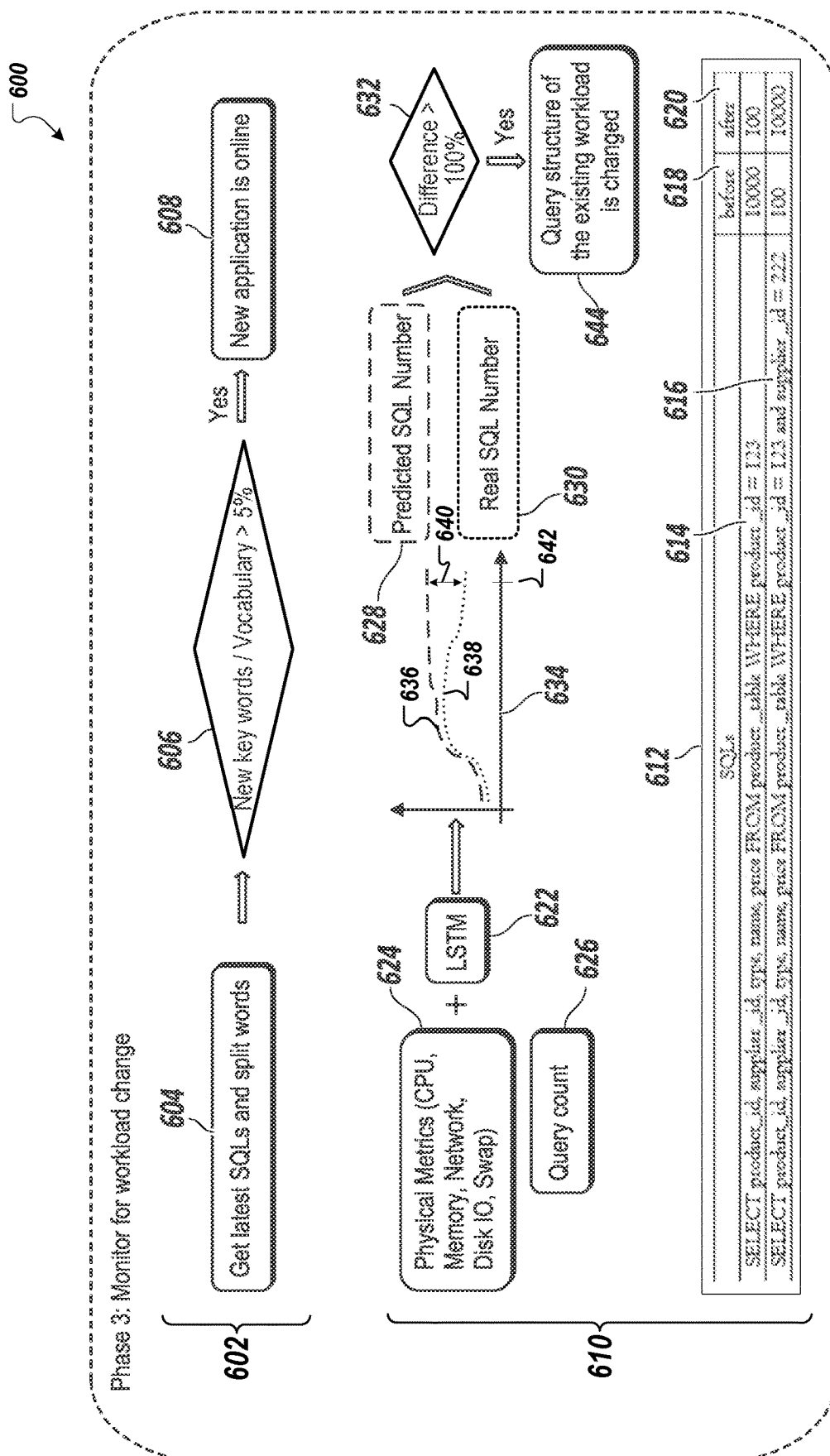
FIG. 6 illustrates an example system for a third phase of monitoring for workload changes.

FIG. 6 illustrates an example system 600 for a third phase of monitoring for workload changes. Different approaches can be used to monitor database workload to determine if the workload has changed. If a determination is made that the workload has changed, re-clustering can be performed to determine whether there are new active columns for candidates for index creation. The system 600 therefore is a reactive system that can reconfigure indices based on varying workloads.

Phase three can include processing 602 to determine whether a new application is now online. The processing 602 can include using a rule-based scheme to monitor for new-application workloads. The processing 602 can include performing split-word processing 604 (e.g., similar to phase one) for recently-performed queries. At 606, a determination can be made as to whether a ratio of new key words included in split-word query patterns to words in a vocabulary (e.g., the vocabulary 418 described above with respect to FIG. 4) is greater than a predetermined threshold (e.g., 5%). At 608, in response to determining that the ratio of new key words included in split-word query patterns to words in the vocabulary is greater than the predetermined threshold, a determination can be made that a new application is online.

Accordingly, phase one (e.g., pre-processing and vectorization) and phase two (e.g., clustering and index check and creation) can be re-performed, to determine whether any new indices are to be created in response to the new application workload.

As another example, phase three can include processing 610 to determine whether the structure of any existing queries has changed. If the structure of frequent queries changes, there may not be indices on all columns in now-changed frequent queries, which can negatively affect performance. For example, a table 612 includes query counts for a first query 614 and a second query 616 for a first period of time 618 (e.g., before a monitoring time point) and a second period of time 620 (e.g., after the monitoring time point).

During the first period of time 618, an index may be configured for a product_id column but not for a supplier_id column. During the first period of time 618, a query count for the first query 614 (which only includes the product_id column in a WHERE clause) may be substantially larger than a query count for the second query 616 (which includes both the product_id column and the supplier_id column in a WHERE clause). An index may have been previously configured for the product_id column based on determining that a query pattern corresponding to the first query 614 is a frequent query pattern and that the product_id column included in the frequent query pattern is an active column. A query pattern corresponding to the second query 616 may not have been previously identified (e.g., before or during the first time period) as a frequent query pattern. However, during the second period of time 620, a query count for the first query 614 may be substantially less than a query count for the second query 616. For example, application code and/or application usage of one or more applications may have changed that results, during the second period of time 620, in a substantial reduction in the query count for the first query 614 and a substantial increase in the query count for the second query 616.

Executions of the second query 616 may suffer from worse performance than executions of the first query, due to an index being configured on the product_id column but not on the supplier_id column. As described in more detail below, the processing 610 in phase three can automatically detect, for example, that a structure of a substantial portion of application queries that formerly matched the first query 614 have been modified to match the second query 616. In response to detection of a change in structure of existing queries, phase one and phase two can be re-performed, to determine whether any new indices are to be created in response to the new query structures. For example, re-performing phase one and phase two can result in an automatic creation of an index for the supplier_id column (e.g., or for a combination of the product_id column and the supplier_id column).

The processing 610 to detect query structure changes can include use of a LSTM model 622 for predicting query structure changes. The LSTM model 622 can learn a functional relationship between physical resource usage (e.g., corresponding to physical metrics 624, such as memory usage, network usage, disk IO (Input/Output) metrics, and memory swap metrics) and query count metrics 626 (e.g., counts of processed queries). To train the LSTM model 622, the physical metrics 624 can be sampled, during a training period (e.g., every minute, or using some other sampling interval). Average values for the physical metrics 624 per hour can be calculated from the sampled data. Query count metrics 626 can be determined for each hour of the training period. The hourly averages of the physical metrics 624 and the hourly query counts can be used to train the LSTM model 622. After being trained, the LSTM model 622 can be tested using new sampling data and new query counts.

After being trained and tested, the LSTM model 622 can be used to predict query structure changes. For example, current physical metrics 624 can be input to the LSTM model 622. The LSTM model 622 can generate a predicted query count 628 for a current time interval. An actual query count 630 can be calculated for the current time interval. If query structure(s) have changed such that a substantial number of queries are being executed that now include active columns that don't have indices, query processing in general may be slower due to less efficient queries (e.g., as compared to a time period before query structure changes in which frequent queries had indices configured for active columns). Slower query processing may result in a fewer number of queries being performed in a same time period, as compared to a time period in which frequent queries had indices configured for active columns.

The processing 610 can include a determination step 632 that determines whether a difference calculation between the predicted query count 628 and the actual query count 630 is more than a threshold percentage (e.g., 100%). For instance, the determination step can determine whether a value of (predicted query count−actual query count)/actual query count is greater than 100%. A graph 634 plots example predicted query counts 636 and example actual query counts 638 (e.g., over one or more time periods). A difference value 640 for a time point 642 may be more than the threshold percentage, for example.

If the determination step 632 results in a determination that the difference calculation is more than the threshold percentage, a determination 644 can be made that query structure(s) of the current workload have changed (e.g., as compared to a prior time period). Accordingly, in response to the determination 644, phase one (e.g., pre-processing and vectorization) and phase two (e.g., clustering and index check and creation) can be re-performed, to determine whether any new indices are to be created in response to the query structure change(s).

Figure 7:
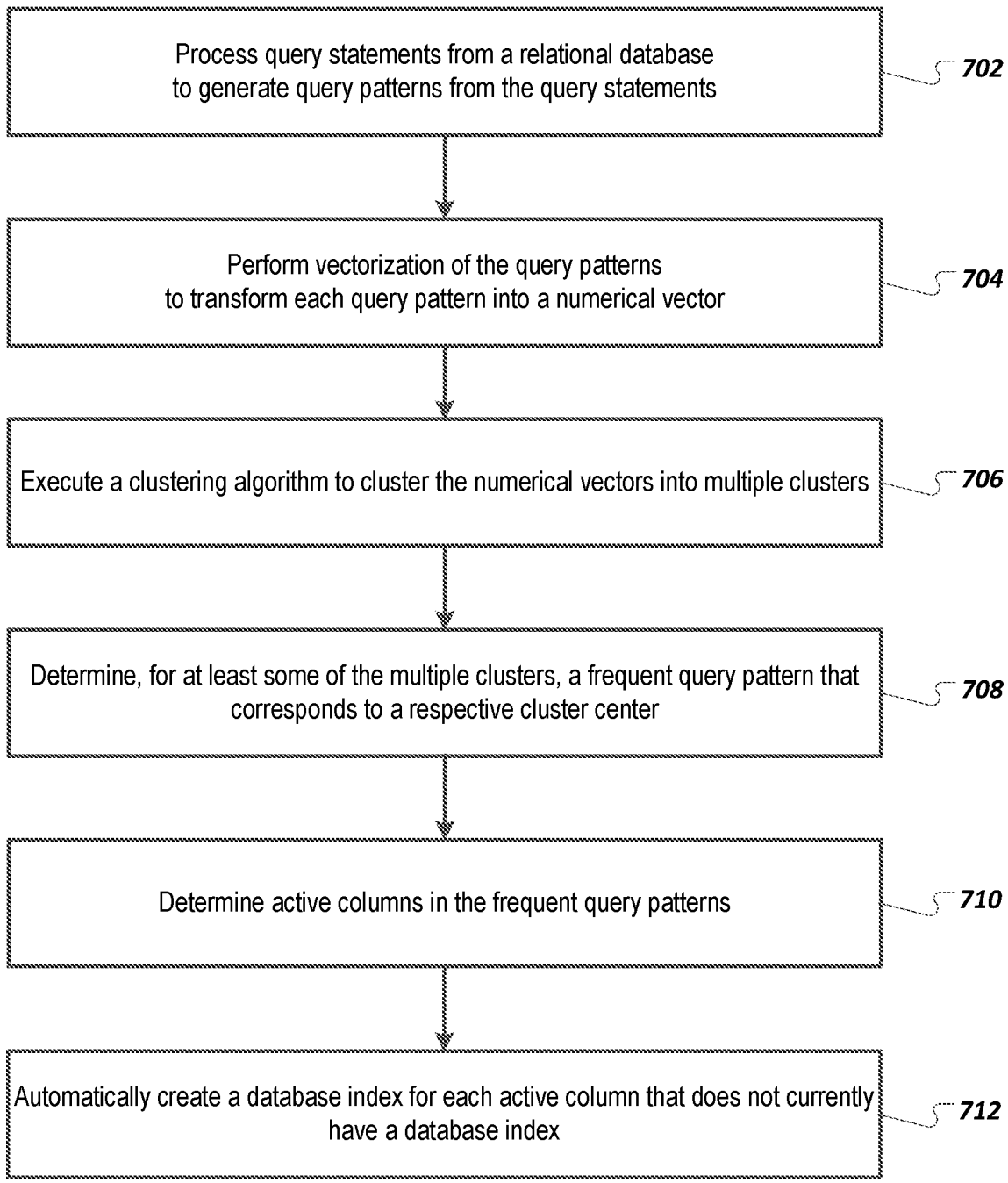
FIG. 7 depicts an example process that can be executed in accordance with implementations of the present disclosure.

FIG. 7 depicts an example process 700 that can be executed in accordance with implementations of the present disclosure. In some examples, the example process 700 is provided using one or more computer-executable programs executed by one or more computing devices.

Query statements from a relational database are processed to generate query patterns from the query statements (702). Generating the query patterns can include removing literal values from the query statements to generate simplified query statements and converting the simplified query statements into lists of single words. Remove literal values can include literal numeric values, literal character values, and literal operator symbols.

Vectorization of the query patterns is performed to transform each query pattern into a numerical vector (704). Performing the vectorization can include creating a vocabulary based on the lists of single words in the generated query patterns and performing a term frequency-inverse document frequency algorithm using the vocabulary and the generated query patterns to transform each query pattern into a numerical vector.

A clustering algorithm is executed to cluster the numerical vectors into multiple clusters (706). Each of the multiple clusters has a respective cluster center. The clustering algorithm can be a Gaussian mixture model algorithm.

A frequent query pattern is determined that corresponds to a respective cluster center, for at least some of the multiple clusters (708). Frequent query patterns can be determined for cluster centers of clusters that represent at least a threshold percentage of query patterns, for example. The frequent query pattern for a cluster center can be determined by performing a reverse search of the numerical vectors to determine a frequent query pattern that corresponds to the numerical vector that corresponds to the cluster center.

Active columns in the frequent query patterns are determined (710). The active columns can be candidate columns for index creation.

A database index is automatically created for each active column that does not currently have a database index (712).

After database indices are automatically created, the database can be automatically monitored for database workload changes. A database workload can change due to a new application coming online and/or to query structure changes, for example. In response to determining that a database workload has changed, steps of the process 700 can be re-performed to automatically generate other database indices. For example, in response to determining that the database workload has changed, recent query statements can be retrieved from the relational database, the recent query statements can be processed to generate updated query patterns, vectorization of the updated query patterns can be performed to generate updated numerical vectors, the clustering algorithm can be executed to generate updated clusters from the updated numerical vectors, updated active columns can be determined from cluster centers in the updated clusters, and a new database index can be automatically created for each updated active column that does not currently have a database index.

Determining that a new application is online can include processing recent query statements to generate new query words and determining that the new application is online based on a ratio of the new query words to words in the vocabulary being more than a predetermined threshold ratio. Determining that query structures have changed can include: training a neural network model to predict query counts based on historical query counts and historical physical database metrics; using a trained neural network model to generate a predicted query count for a current time period; determining an actual query count for the current time period; and determining that the query structures have changed based on a difference between and the actual query count being more than a predetermined threshold difference.

Figure 8:
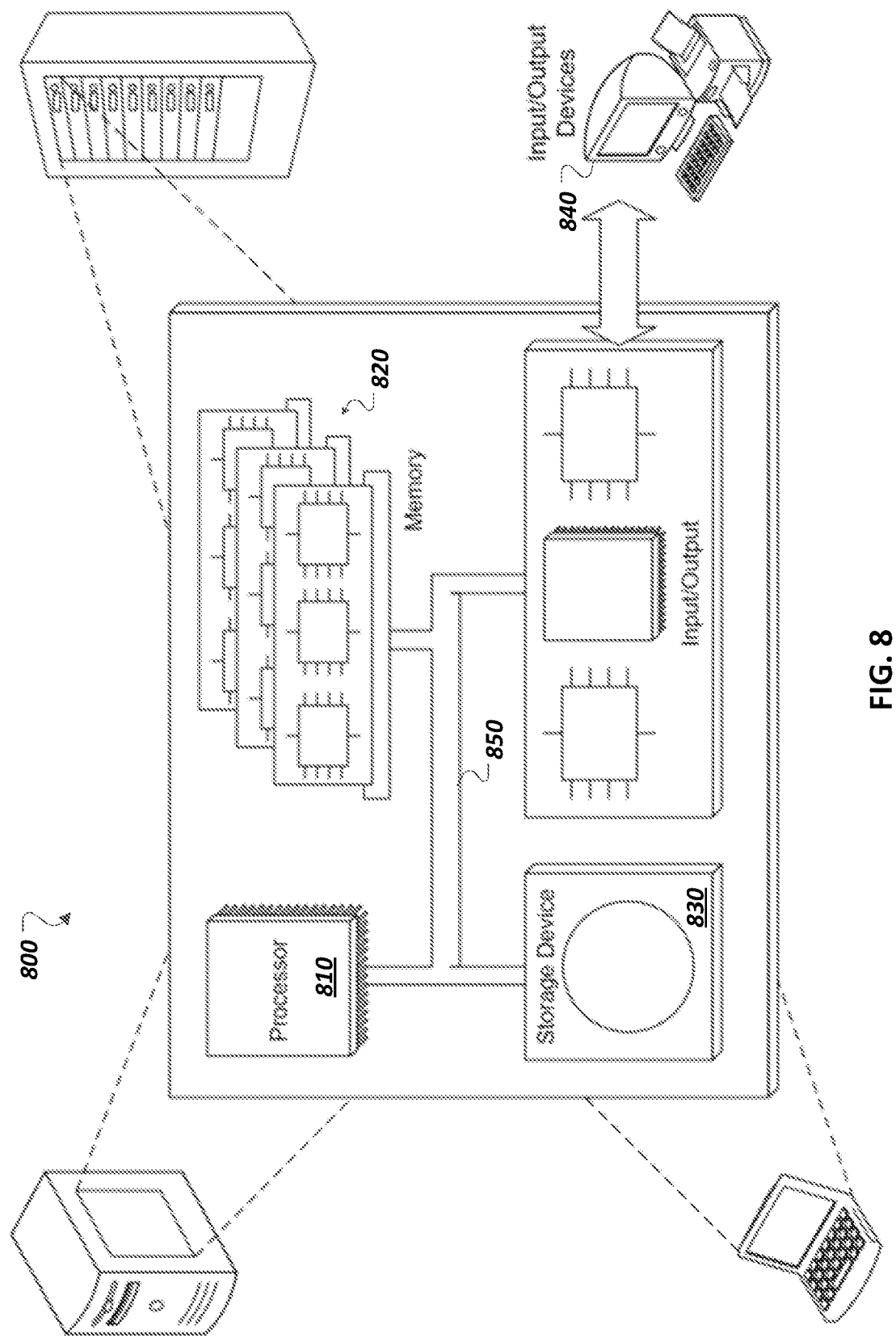
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically creating database indices, comprising:
    generating a set of query patterns by processing query statements that query relational database columns from a relational database;
    transforming each query pattern into a numerical vector by performing vectorization of the query patterns;
    clustering the numerical vectors into a set of clusters by executing a clustering algorithm, wherein each cluster in the set of clusters has a respective cluster center;
    in response to determining that a number of numerical vectors of at least one cluster exceeds a first threshold number, splitting the at least one cluster into multiple clusters within the set of clusters;
    defining a sub-set of clusters of the set of clusters, each cluster in the sub-set of clusters containing numerical vectors that exceed a second threshold number that is less than the first threshold number;
    determining, for each cluster in the sub-set of clusters, a frequent query pattern that corresponds to a respective cluster center to provide a set of frequent query patterns;
    determining active database columns in frequent query patterns in the set of frequent query patterns; and
    automatically creating a database index for each active column that does not currently have a database index.

2. The computer-implemented method of claim 1, wherein generating the query patterns comprises:
    removing literal values from the query statements to generate simplified query statements; and
    generating the query patterns by converting the simplified query statements into lists of single words.

3. The computer-implemented method of claim 2, wherein performing the vectorization comprises:
    creating a vocabulary based on the lists of single words in the generated query patterns; and
    performing a term frequency-inverse document frequency algorithm using the vocabulary and the generated query patterns to transform each query pattern into a numerical vector.

4. The computer-implemented method of claim 3, further comprising:
    automatically monitoring for database workload changes; and
    in response to determining that a database workload has changed:
        retrieving recent query statements from the relational database;
        processing the recent query statements to generate updated query patterns;
        performing vectorization of the updated query patterns to generate updated numerical vectors;
        executing the clustering algorithm to generate updated clusters from the updated numerical vectors;
        determining updated active columns from cluster centers in the updated clusters; and
        automatically creating a new database index for each updated active column that does not currently have a database index.

5. The computer-implemented method of claim 4, wherein determining that the database workload has changed comprises determining that a new application is online, and wherein determining that the new application is online comprises:
    processing recent query statements to generate new query words; and
    determining that the new application is online based on a ratio of the new query words to words in the vocabulary being more than a predetermined threshold ratio.

6. The computer-implemented method of claim 4, wherein determining that the database workload has changed comprises determining that query structures have changed, and wherein determining that the query structures have changed comprises:
    training a neural network model to predict query counts based on historical query counts and historical physical database metrics;
    using a trained neural network model to generate a predicted query count for a current time period;
    determining an actual query count for the current time period; and
    determining that the query structures have changed based on a difference between and the actual query count being more than a predetermined threshold difference.

7. The computer-implemented method of claim 1, wherein the clustering algorithm is a Gaussian mixture model algorithm.

8. The computer-implemented method of claim 1, wherein the first threshold number and the second threshold number represent respective threshold percentages of query patterns in the set of query patterns.

9. A non-transitory computer-readable storage medium coupled to one or more processors and having instructions stored thereon which, when executed by the one or more processors, cause the one or more processors to perform operations for automatic index creation for relational database systems, the operations comprising:
    generating a set of query patterns by processing query statements that query relational database columns from a relational database;
    transforming each query pattern into a numerical vector by performing vectorization of the query patterns;

clustering the numerical vectors into a set of clusters by executing a clustering algorithm, wherein each cluster in the set of clusters has a respective cluster center;

in response to determining that a number of numerical vectors of at least one cluster exceeds a first threshold number, splitting the at least one cluster into multiple clusters within the set of clusters;

defining a sub-set of clusters of the set of clusters, each cluster in the sub-set of clusters containing numerical vectors that exceed a second threshold number that is less than the first threshold number;

determining, for each cluster in the sub-set of clusters, a frequent query pattern that corresponds to a respective cluster center to provide a set of frequent query patterns;

determining active database columns in frequent query patterns in the set of frequent query patterns; and automatically creating a database index for each active column that does not currently have a database index.

10. The computer-readable storage medium of claim 9, wherein generating the query patterns comprises:

removing literal values from the query statements to generate simplified query statements; and generating the query patterns by converting the simplified query statements into lists of single words.

11. The computer-readable storage medium of claim 10, wherein performing the vectorization comprises:

creating a vocabulary based on the lists of single words in the generated query patterns; and performing a term frequency-inverse document frequency algorithm using the vocabulary and the generated query patterns to transform each query pattern into a numerical vector.

12. The computer-readable storage medium of claim 11, wherein the operations further comprise:

automatically monitoring for database workload changes; and in response to determining that a database workload has changed:

retrieving recent query statements from the relational database;

processing the recent query statements to generate updated query patterns;

performing vectorization of the updated query patterns to generate updated numerical vectors;

executing the clustering algorithm to generate updated clusters from the updated numerical vectors;

determining updated active columns from cluster centers in the updated clusters; and automatically creating a new database index for each updated active column that does not currently have a database index.

13. The computer-readable storage medium of claim 12, wherein determining that the database workload has changed comprises determining that a new application is online, and wherein determining that the new application is online comprises:

processing recent query statements to generate new query words; and determining that the new application is online based on a ratio of the new query words to words in the vocabulary being more than a predetermined threshold ratio.

14. The computer-readable storage medium of claim 12, wherein determining that the database workload has changed comprises determining that query structures have changed, and wherein determining that the query structures have changed comprises:

training a neural network model to predict query counts based on historical query counts and historical physical database metrics;

using a trained neural network model to generate a predicted query count for a current time period;

determining an actual query count for the current time period; and determining that the query structures have changed based on a difference between and the actual query count being more than a predetermined threshold difference.

15. A system, comprising:

a computing device; and a computer-readable storage device coupled to the computing device and having instructions stored thereon which, when executed by the computing device, cause the computing device to perform operations for automatic index creation for relational database systems, the operations comprising:

generating a set of query patterns by processing query statements that query relational database columns from a relational database;

transforming each query pattern into a numerical vector by performing vectorization of the query patterns;

clustering the numerical vectors into a set of clusters by executing a clustering algorithm, wherein each cluster in the set of clusters has a respective cluster center;

in response to determining that a number of numerical vectors of at least one cluster exceeds a first threshold number, splitting the at least one cluster into multiple clusters within the set of clusters;

defining a sub-set of clusters of the set of clusters, each cluster in the sub-set of clusters containing numerical vectors that exceed a second threshold number that is less than the first threshold number;

determining, for each cluster in the sub-set of clusters, a frequent query pattern that corresponds to a respective cluster center to provide a set of frequent query patterns;

determining active database columns in frequent query patterns in the set of frequent query patterns; and automatically creating a database index for each active column that does not currently have a database index.

16. The system of claim 15, wherein generating the query patterns comprises:

removing literal values from the query statements to generate simplified query statements; and generating the query patterns by converting the simplified query statements into lists of single words.

17. The system of claim 16, wherein performing the vectorization comprises:

creating a vocabulary based on the lists of single words in the generated query patterns; and performing a term frequency-inverse document frequency algorithm using the vocabulary and the generated query patterns to transform each query pattern into a numerical vector.

18. The system of claim 17, wherein the operations further comprise:

automatically monitoring for database workload changes; and in response to determining that a database workload has changed:

retrieving recent query statements from the relational database;

processing the recent query statements to generate updated query patterns;

performing vectorization of the updated query patterns to generate updated numerical vectors;

executing the clustering algorithm to generate updated clusters from the updated numerical vectors;

determining updated active columns from cluster centers in the updated clusters; and automatically creating a new database index for each updated active column that does not currently have a database index.

19. The system of claim 18, wherein determining that the database workload has changed comprises determining that a new application is online, and wherein determining that the new application is online comprises:

processing recent query statements to generate new query words; and determining that the new application is online based on a ratio of the new query words to words in the vocabulary being more than a predetermined threshold ratio.

20. The system of claim 18, wherein determining that the database workload has changed comprises determining that query structures have changed, and wherein determining that the query structures have changed comprises:

training a neural network model to predict query counts based on historical query counts and historical physical database metrics;

using a trained neural network model to generate a predicted query count for a current time period;

determining an actual query count for the current time period; and determining that the query structures have changed based on a difference between and the actual query count being more than a predetermined threshold difference.

\* \* \* \* \*